United States Patent [19]
Cain et al.

[11] Patent Number: 6,143,348
[45] Date of Patent: Nov. 7, 2000

[54] LOW SATURATED FATTY ACID OILS

[75] Inventors: Frederick William Cain, Voorburg, Netherlands; Paul Thomas Quinlan, Bedford; Stephen Raymond Moore, Thrapston, both of United Kingdom

[73] Assignee: Loders-Croklaan B.V., Wormerveer, Netherlands

[21] Appl. No.: 09/505,170

[22] Filed: Feb. 16, 2000

Related U.S. Application Data

[62] Division of application No. 08/777,089, Dec. 30, 1996, Pat. No. 6,040,161, which is a continuation of application No. 08/415,067, Mar. 31, 1995, abandoned.

[30] Foreign Application Priority Data

Mar. 31, 1994 [EP] European Pat. Off. .............. 94302325

[51] Int. Cl.⁷ ...................................... A23D 9/00
[52] U.S. Cl. .......................... 426/601; 426/606; 426/607; 435/134; 554/223; 554/224; 554/227
[58] Field of Search .................. 426/601, 606, 426/607; 554/227, 223, 224

[56] References Cited

U.S. PATENT DOCUMENTS

| | | | |
|---|---|---|---|
| 2,634,278 | 4/1953 | Kurt | 260/410.7 |
| 2,740,799 | 4/1956 | Young | 260/410.7 |
| 3,435,024 | 3/1969 | Nobile et al. | 260/210 |
| 4,797,233 | 1/1989 | Zinnen | 554/193 |
| 4,976,984 | 12/1990 | Yasukawa et al. | 426/602 |
| 5,160,759 | 11/1992 | Nomura et al. | 426/602 |
| 5,225,580 | 7/1993 | Zinnen | 554/30 |
| 5,271,950 | 12/1993 | Yamaguchi et al. | 426/607 |
| 5,508,048 | 4/1996 | Padley | 426/607 |
| 5,514,405 | 5/1996 | Yokomichi et al. | 426/604 |
| 5,681,608 | 10/1997 | Cain | 426/606 |
| 5,718,938 | 2/1998 | Cain | 426/607 |
| 5,731,027 | 3/1998 | Cain | 426/607 |
| 5,879,735 | 3/1999 | Cain | 426/603 |
| 5,908,654 | 6/1999 | Cain | 426/607 |
| 5,912,042 | 6/1999 | Cain | 426/607 |
| 5,968,584 | 10/1999 | Cain | 426/607 |
| 6,040,161 | 3/2000 | Cain | 435/134 |

FOREIGN PATENT DOCUMENTS

| | | |
|---|---|---|
| 0 326 198 | 8/1989 | European Pat. Off. . |
| WO 90/12858 | 11/1990 | European Pat. Off. . |
| 0 402 090 | 12/1990 | European Pat. Off. . |
| 2 685 706 | 2/1993 | France . |
| 160840 | 11/1922 | United Kingdom . |
| 1099777 | 1/1968 | United Kingdom . |
| WO 91/08677 | 6/1991 | WIPO . |

OTHER PUBLICATIONS

JP63295551 (abstract).
JP63116697 (abstract).

Primary Examiner—Carolyn Paden
Attorney, Agent, or Firm—Pillsbury Madison & Sutro LLP

[57] ABSTRACT

Liquid oils with a SAFA-content of less than 5 wt % can be obtained by conversion of a fatty compound (A), preferably having a SAFA-level of more then 5 wt %, with a reactant (B), capable of forming different reaction products of the non-triglyceride type ($C_1$, $C_2$ etc.) having a different melting point and/or different solubility in compound (A); the SAFA-level of the end product can be controlled by separating the precipitate of the higher melting more saturated reaction-products ($C_1$, $C_2$ etc.) from the rest of the reaction mixture.

5 Claims, No Drawings

LOW SATURATED FATTY ACID OILS

This is a division of application Ser. No. 08/777,089, filed Dec. 30, 1996, now U.S. Pat. No. 6,040,161 which is a continuation of Appln. Ser. No. 08/415,067, filed on Mar. 31, 1995 now abandoned.

BACKGROUND OF THE INVENTION

During the last decade an increasing demand for liquid oils with low SAFA-contents was developed. Those oils are considered to be more healthy than the oils with a higher SAFA level.

In EP 326 198 (published in 1989) cooking or salad oils are disclosed that comprise triglycerides that contain 60–92 wt % oleic acid; 5–25 wt % linoleic acid; 0–15 wt % linolenic acid, while less than 3 wt % saturated fatty acids are present.

According to the above EP document the oils can be prepared along a completely chemical route (as exemplified in example 1), by a solid liquid adsorption process, using a specific adsorbent and a specific solvent system (as exemplified in example 2) or by a chromatographic method (as exemplified by example 3). However, none of the above methods of preparation is economically feasible and therefore the above methods are unattractive.

From FR 2 685 706 a process is known for the preparation of pharmaceutical compositions with a diglyceride support. The diglycerides can be made by glycerolysis of liquid oils. However the products obtained are still high in saturated fatty acids (about 9–10 wt %), while the methodology applied for the glycerolysis is not well disclosed.

According to WO 90/12858 long chain fatty acid triglycerides, including poly unsaturated long chain triglycerides can be prepared by lipase-catalyzed interesterification of long chain free acids or lower alkyl esters thereof with short chain triglycerides. The triglycerides should have low contents of mono- and diglycerides. The liberated short chain free fatty acids are removed by evaporation during the enzymic conversion.

Therefore this document does not reveal a process for the preparation of low SAFA-oils, wherein relatively large amounts of diglycerides are present. Neither does this document disclose a process wherein the SAFA-content of the end product is controlled by the solubility of the different conversion-products formed during the reaction.

According to U.S. Pat. No. 5,225,580 highly unsaturated triglycerides are obtained by subjecting an interesterification reaction product to sequential chromatographic separation. However the products that are low in SAFA, which are obtained by this process, are also low in diglycerides (col. 4, 1. 54–62), while these triglycerides also contain high levels of $C_{18:1}$ (c.f.: table 12: raffinate).

According to WO 91/08676 (published in 1991) transesterified low saturated liquid oils can be prepared. Those oils contain less than 3.5 wt % saturated $C_{12}$–$C_{18}$ fatty acid and at least 96% unsaturated $C_{12}$–$C_{22}$ fatty acids, while the weight ratio mono-unsaturated (=MUFA) to poly-unsaturated fatty acids (=PUFA) ranges from 10 to 0.5. The above-mentioned oils further comprise 2–15 wt % of diglycerides and 85–98 wt % of triglycerides.

The above-mentioned oils are obtained from an unsaturated fatty acid source material ($C_{12}$–$C_{22}$ unsaturated fatty acids and/or its esters) and a vegetable oil, high in MUFA and/or PUFA by performing an enzymic interesterification. After removal of free fatty acids and/or its esters, the product oil is collected.

Therefore, the above-mentioned method requires the use of starting materials that are very rich in mono- and/or poly-unsaturated fatty acid materials. Moreover, the diglyceride content of the end product is maximized to 15 wt %.

Another disadvantage of the above-mentioned prior art is that the product liquid oils are limited in its PUFA-content (in particular the $C_{18:2}$ content). Recently Roberts c.s. disclosed in Br. Heart Journ. (1993), 70, p. 524–529 that there is an inverse relation between the risk of sudden cardiac death and the linoleic acid content in the adipose tissue. So, in effect it should be expected that the healthiest liquid oils should not only be low in SAFA, but also relatively high in PUFA, in particular rich in $C_{18:2}$.

The prior art, however, does not reveal a commercially attractive process for the preparation of those oils.

SUMMARY OF THE INVENTION

We have studied whether such oils could be made by a commercially feasible route. We found that such a route exists when using the fact that high melting fatty compounds (=diglycerides and monoglycerides) or its high melting cation salts, which are all rich in saturated fatty acid residues, can be separated from low melting fatty compounds, or its low melting cation salts, which are all rich in unsaturated fatty acid residues. The high melting products and the low melting products do have a different solubility in the reaction system, applied during its preparation. Therefore, the less soluble (high melting) saturated products will be precipitated during the conversion and this precipitation can be used in order to drive the conversion to more completion, while the product obtained after removal of the precipitate will have a lowered SAFA content and an increased MUFA and/or PUFA content.

DETAILED DESCRIPTION OF THE INVENTION

Therefore, our invention concerns a process for the production of liquid oils with a SAFA-content below 5 wt %, wherein a fatty compound (A), comprising at least a saturated and an unsaturated fatty acid moiety, preferably with a SAFA-level of more than 5 wt %, is converted with a reactant B, capable of forming different reaction products of the non-triglyceride type (=$C_1$; $C_2$; etc. ) with the fatty compound (A), which products ($C_1$: $C_2$; etc.) have a different melting point and/or different solubility in compound A, while the SAFA-level of the liquid oil product is decreased by precipitating and removal of the higher melting and/or less soluble, reaction products ($C_1$; $C_2$; etc.) of the non-triglyceride-type. It will be clear that our process can be applied for the production of oils with less than 5 wt % SAFA from oils with more than 5 wt % SAFA, but also for a further decrease of the SAFA-content of oils that already have a SAFA-content below 5 wt %.

In this process the fatty component (A) is selected from the group, consisting of: sunflower oil, high oleic sunflower oil, safflower oil, high oleic safflower oil, corn oil, cottonseed oil, rapeseed oil and soybean oil.

The reactant B in our novel process is selected from the group consisting of polyhydroxy compounds, such as glycol or glycerol, long chain fatty alcohols (6–22 C-atoms), long chain unsaturated fatty acids or their esters and basic salts of inorganic cations, in particular basic $Na^+$, $K^+$, $Mg^{2+}$ or $Ca^{2+}$ salts.

It will be evident, that the reaction products ($C_1$; $C_2$, etc.) from the conversion of liquid oil (A) and glycerol as reactant (B) will comprise a mixture of different diglycerides and mono-glycerides, as oil (A) contains both saturated and unsaturated fatty acid moieties the diglyceride-part of the crude reaction will be built up by diglycerides SS, SU and UU (S=saturated and U=unsaturated fatty acid). While the monoglyceride part will contain monosaturated and monounsaturated species. The saturated partial glycerides will have a higher melting point and/or lower solubility than the unsaturated products. Therefore the highly saturated partial glycerides will be precipitated predominantly.

Similar observations can be made for systems, wherein reactant (B) is a long-chain fatty alcohol (the products $C_1$ and $C_2$ etc. being partial glycerides and wax-esters) or a cation salt (the products $C_1$ and $C_2$ etc. being cation-salts of free fatty acids).

The conditions that we can apply for the conversion are typically for a batch-process, using oil and glycerol:

weight-ratio: oil: glycerol=1:10 to 100:1
reaction-times: 6–120 hrs.
temperature: 0–40° C.
lipases: selected from the groups Rhizopus, Rhizomucor, Pseudomonas, Candida, but preferably Humicola lipase in amounts of: 100–1000 LU/gm of oil.

Although our process can be conducted by using a base (e.g. Na-methanolate) as a catalyst, we prefer to apply an enzyme, either a 1.3-specific or random enzyme. In particular, we prefer to use Humicola, when we convert a liquid vegetable oil with glycerol. The products that can be obtained by our process display:

(1) a SAFA-content<5 wt %, preferably<3 wt %
(2) a weight ratio $$\frac{C18:2}{C18:1} > 2.0$$

(3) a $C_{18:2}$ content of>25 wt %, preferably>40 wt %
(4) a $C_{18:3}$ content of 0–20 wt %
(5) a diglyceride content of 15–70 wt %, in particular 15–30 wt %

After removal of the precipitate e.g. by filtration the crude reaction product will also contain some parts of other reaction products (e.g. monoglyceride, free fatty acids, wax-esters, alcohols) we prefer to subject this crude reaction product to a molecular distillation or to a fractionation (e.g. a solvent fractionation) for the removal of at least part of those products.

In case we have performed a glycerolysis (so: B=glycerol) our crude reaction product will contain some partial glycerides. The quality of our crude reaction product can be improved by subjecting it to treatments, that can be used to remove or convert the monoglycerides and diglycerides i.e. silica refining; reaction with acids and enzyme-treatment. Therefore, our invention also concerns a process, wherein the product obtained as our reaction product is reacted with unsaturated fatty acids, either chemically or enzymatically, in order to decrease the SAFA-content of the product further.

The liquid oils as obtainable according to our novel process can be applied in the production of food products. Examples of such food products are salad oils, dressings, frying oils and mayonnaise. At least part of the liquid oil component present therein will then consist of our liquid oils, as obtained by our novel process.

Our process can be used for the production of known liquid oils, e.g. as covered by EP 402,090, or EP 326,198 or WO 91/0876. However, our process can also be applied for the production of novel liquid oils. Therefore, part of our invention are also novel liquid oils, having a SAFA content of<5 wt %, preferably<3 wt %
a weight ratio $$\frac{C18:2}{C18:1} > 2.0$$

a $C_{18:2}$ content of>25 wt %, in particular >40 wt %
a $C_{18:3}$ content of 0–20 wt %, in particular 0.5–10 wt %
a diglyceride content of 15–30 wt %

As our liquid oils are rich in $C_{18:2}$ (or in general in: PUFA) the stability of our products is not always as desired.

This stability, however, can be improved by the incorporation of $10^2$–$10^5$ ppm of one or more (natural) anti-oxidants, in particular selected from the tocopherols.

EXAMPLE

Glycerol and Sunflower oil were mixed in a weight ratio of 5 parts sunflower oil to 1 part glycerol by weight. Lipolase® 100L ex Novo Nordisk was added to this mixture in a proportion of 0.05 parts by weight. Additionally 0.05 parts by weight of an 0.01 m phosphate buffer (pH=7.0) were added. This resulting mixture was stirred to disperse the glycerol and lipase through the oil and allow reaction to take place at 20° C.

After 5 days the reaction was stopped by heating the system to 80° C. and the glycerol was separated. The oil phase was then precipitated as 5° C. and pressed through a filtercloth. The liquid olein fraction was collected. The composition of the olein fraction, intermediates and feed is shown below (partial glycerides were analysed by straight phase HPLC and saturated/unsaturated fatty acid composition by FAME GLC).

|  | TAG | DAG | MAG | % sat. | % unsat. |
| --- | --- | --- | --- | --- | --- |
| Feed oil (SF) | 98.7 | 1.3 | — | 12.4 | 87.6 |
| Glycerolysis product | 34.3 | 36.7 | 29.0 | 12.4 | 87.6 |
| Olein fraction | 55 | 30 | 15 | 2.4 | 97.6 |

Fatty acid composition of the olein fraction:

| | |
| --- | --- |
| $C_{18:2}$ | 71.8 |
| $C_{18:3}$ | 0.1 |
| $C_{18:2}/C_{18:1}$ | 2.8 |

Tag=Triacyl glycerol
Dag=Diacyl glycerol
Mag=Monoacyl glycerol

What is claimed is:

1. Low SAFA oil, having a SAFA content of<5 wt %
a weight ratio $$\frac{C18:2}{C18:1} > 2.0$$

a $C_{18:2}$ content of >25 wt % a $C_{18:3}$ content of 0–20 wt % and a diglyceride content of 15–30 wt %.

2. Low SAFA oil according to claim 1 having a SAFA content of <3 wt %, a $C_{18:2}$ content of >40 wt %, and a $C_{18:3}$ content of 0.5–10 wt %.

3. Low SAFA oil according to claim 1, wherein in the oil 100–$10^5$ ppm of one or more natural anti-oxidants is incorporated.

4. Low SAFA oil according to claim 3 wherein the natural antioxidant is selected from the tocopherols.

5. Food products, selected from the group consisting of salad oils, dressings, frying oils and mayonnaise, all comprising a liquid oil component, wherein the liquid oil component is the liquid oil according to claim 1.

* * * * *